United States Patent Office 3,387,082
Patented June 4, 1968

3,387,082
PAY TELEVISION AUDIENCE SURVEY AND
BILLING SYSTEM
Richard J. Farber, New Hyde Park, N.Y., assignor to
Hazeltine Research, Inc., a corporation of Illinois
Filed Dec. 23, 1963, Ser. No. 332,680
9 Claims. (Cl. 178—6)

ABSTRACT OF THE DISCLOSURE

An audience survey system for use in a pay television system including apparatus for supplying a plurality of interrogation signals individually coded to correspond to a single one of a plurality of receiving stations. When applicable, each receiving station responds to its respective interrogation signal with a reply signal acknowledging acceptance of a particular program. Each reply signal is correlated with its respective interrogation signal and each correlation is recorded to obtain audience billing information. The reply signals are also accumulated and displayed in order to obtain audience interest information. Alternative arrangements are also covered.

---

Figure 1A:
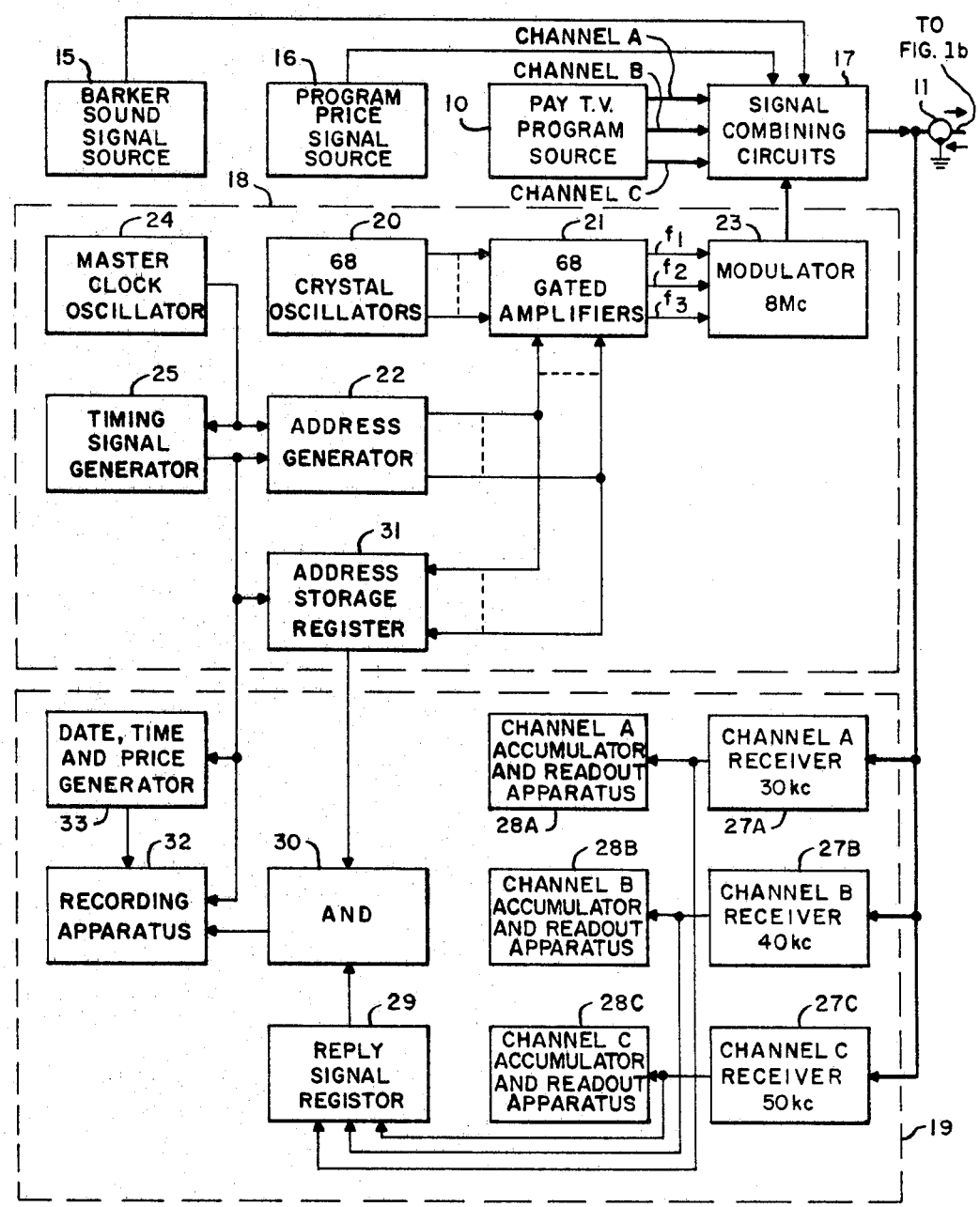
Figure 1B:
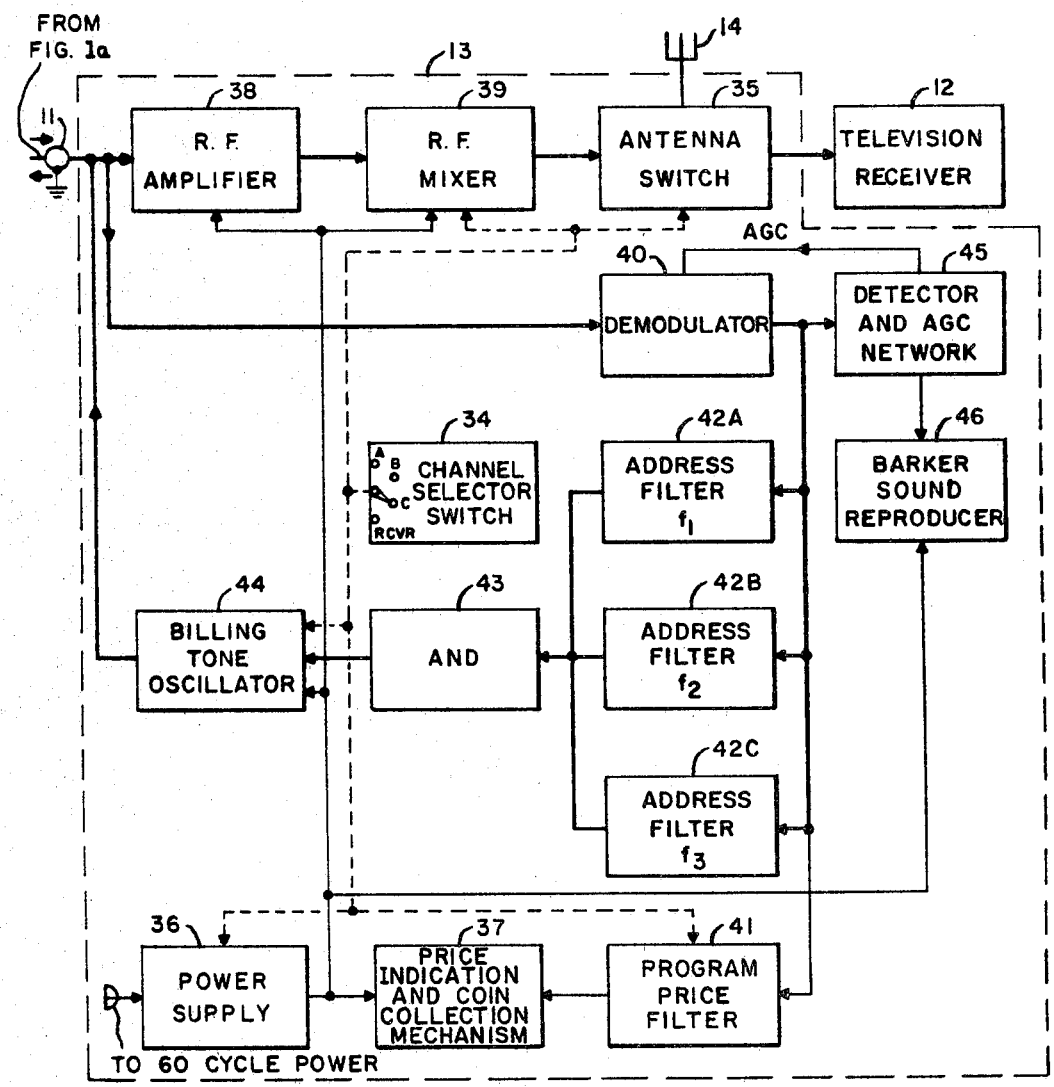

The present invention relates to a new and improved pay television system. In particular, it relates to a pay television system which utilizes a new and improved audience survey system performing such useful functions as, for example, obtaining billing requirements and pay television channel usage.

In pay television systems of the type contemplated by the present invention, it has heretofore been customary to provide adapters at the receivers for such purposes as accepting program payment and recording certain statistical information by means of a recording device located in the adapter. A television system of this type is described in Electronics magazine, Aug. 19, 1960, in an article entitled "How a Closed-Circuit Pay TV System Works," page 49 et seq. Regarding the accepting of program payment, this is done either by the subscriber's depositing of the requisite coins in a coin collection device in the adapter which are then periodically collected by transmitter station personnel or in the case of a credit subscriber, by the subscriber's pushing of a button on the adapter indicating his willingness to have the program charge billed to his monthly account. Either of these actions by the subscriber causes a recording to be made in the adapter indicating payment or desire to accept the charge. By means of timing pulses sent out from the transmitter and recorded by the tape, the time of payment recording also includes the program selected by the subscriber. In either case, once the program charge has been acknowledged by the appropriate payment function, an interlock device in the adapter permits the previously inhibited pay television program to be coupled to the customer's receiver and the program is thereupon reproduced in the usual manner.

In addition to the function of preventing reproduction of the pay television program until the appropriate program charge acknowledgment has been made, it is also necessary to provide a record of certain statistical information relating to the subscriber's reception of the pay program. These are, for example, the amount of money deposited in the coin device or the charge accepted by the credit subscriber and the date and time of the program received as previously indicated. Other information may be necessary, but the foregoing will be sufficient for purposes of this explanation. This information is needed by the transmitting station not only to indicate how much money is forthcoming for the month's programs, but also to provide an indication of the popularity of any given program. For this latter reason it is desirable to have the information as to the number of viewers as quickly as possible even simultaneously with the presentation of the program if possible. However, when the information is recorded in the respective adapters at each viewer location, it is not practical to obtain this information until the periodic collection is made, which in some cases might be as long as a month after the program is presented.

For this reason it is desirable to obtain this information at some central information storage location which, for example, may be at the central transmitting station.

It is therefore an object of this invention to provide a new and improved pay television system.

Another object of this invention is to provide in a pay television system a new and improved audience survey system which facilitates the billing of credit customers.

A further object of this invention is to provide in a pay television system a new and improved audience survey system which will indicate television channel usage during the broadcast of system programs.

Still another object of this invention is to provide in a pay television system devices which both enable reproduction of television programs and which provide means for furnishing a central location with useful audience interest information while such programs are reproduced.

In accordance with one feature of the present invention there is provided a pay television system which comprises signal source means for supplying a television signal and for supplying a plurality of interrogation signals individually coded to correspond to a single one of the following receiving means. The system also includes a plurality of receiving means each for enabling reproduction of a television program from the supplied television signal upon acknowledgment of a prescribed program charge by a viewer and each of which includes means responsive to an individual one of the interrogation signals for sending back to the first means a reply signal representative of the program charge acknowledgment and of the program corresponding thereto. The system further includes coupling means for intercoupling the aforementioned first means to the plurality of receiving means.

In accordance with another feature of the present invention, there is provided an audience survey system for a pay television system of the type in which a television signal is supplied to a plurality of receiving stations, each of which includes apparatus adapted to prevent reproduction of the supplied television signal prior to acknowledgment by the viewer of a prescribed program charge. The survey system comprises first means for supplying a plurality of interrogation signals individually coded to correspond to a single one of the above-mentioned receiving stations and means in each of the receiving stations individually responsive to its respective interrogation signal for sending back to the first means a reply signal representative of the program charge acknowledgment and of the program corresponding thereto.

In accordance with still another feature of the present invention, there is provided control apparatus for use in a receiving station of a pay television system which comprises program charge acknowledgment means for preventing reproduction of a received pay television program prior to acknowledgment, by the viewer, of a prescribed program charge. The control apparatus also includes means for receiving a plurality of coded interrogation signals and for selecting one of the coded signals and means responsive to the acknowledgment means and to the selected interrogation signal after acknowlegment has been made by the viewer for sending out a reply signal representative of the acknowledgment and of the television program corresponding thereto.

For a better understanding of the present invention together with other and further objects thereof, reference is had to the following description taken in connection with the accompanying drawing, and its scope will be pointed out in the appended claims.

In the drawing, the sole figure in this specification, is a block diagram of one example of a pay television system constructed in accordance with the teachings of the present invention.

Shown in the figure is a pay television program signal source 10 which preferably simultaneously supplies a number of program offerings, for example, three, corresponding respectively to channels A, B and C. These program signals are supplied by a coupling means such as for example, a coaxial cable system 11, to a plurality of receiving stations of which one is shown in the figure. Each receiving station comprises a control apparatus 13 constructed in accordance with the present invention and described more fully below. Briefly however, apparatus 13 is for enabling reproduction, by a conventional unmodified television receiver 12, of a television program from a supplied television signal. In a preferred embodiment of the invention, apparatus 13 is incorporated in an adapter whose only electrical connection with the conventional receiver 12 is to the terminals of antenna 14.

Each pay television program signal preferably occupies a bandwidth larger than the conventional 6 mc. bandwidth and is modulated on a carrier frequency chosen so that all three modulated program signals lie in the frequency spectrum from 10 to 40 mc. The additional bandwidth is used on the vestigial sideband side to reduce phase distortion near the carrier frequency and thus improve transient response. However, the modulation components of program signals A, B and C appear, with respect to their individual carriers, in an order inverse to that found in a signal which conforms exactly to Federal Communications Commission (FCC) standards as found in part 3 of the FCC rules.

The system shown in the figure includes a "Barker" sound signal source 15 which generates an intermediate-frequency audio modulated signal which further modulates a carrier frequency which may be chosen for example, as 8 mc. This signal is sent to the receiving station for the purpose of supplying information relating to program offerings and program prices.

The system further includes a program price signal source 16 which can be, for example, a pulse generator whose output is a set of pulse trains each of which is coded to correspond to the viewing charge for the program then being offered on channels A, B and C. These pulse trains are supplied to the receiving stations as modulations of a carrier frequency which, for example, may be 8 mc. In the preferred embodiment of the present invention, the "Barker" signals and the price signals are combined in signal combining circuits 17 for transmission on coaxial cable system 11. However, it is to be appreciated that the "Barker" and price signals may be transmitted to the receiving stations by other well-known means, such as radiation from an antenna.

Three important features of the pay television system shown in the figure comprise in combination an audience survey system. These are the novel customer interrogation apparatus 18, the novel customer survey and billing apparatus 19 and the novel control apparatus 13 used in each receiving station. In accordance with the invention, interrogation apparatus 18 supplies to the receiving stations in the system a plurality of interrogation signals, each of which is coded to correspond to a single one of the receiving stations. In a manner more fully described below, each station in response to its own interrogation signal transmits to survey and billing apparatus 19, for example, by way of coaxial cable system 11, a reply signal which is used by apparatus 19 to produce customer billing requirements as well as to produce useful customer program interest information while the pay programs are viewed.

Referring to apparatus 18, each receiving station in the system is given a coded address which is composed of three discrete frequencies selected from a group of sixty-eight (68) available frequencies which may, for example, lie at 3 kc. intervals in the bandwidth from 600 to 810 kc. Fifty thousand unique subscriber codes can be derived from the sixty-eight frequencies which are generated by sixty-eight (68) crystal oscillators 20. The output of each oscillator 20 is coupled to one of sixty-eight gated amplifiers 21 which are gated into operation, three at a time, by an address generator 22, thus producing a unique address comprising frequencies $f_1$, $f_2$ and $f_3$. The address generator 22 is a conventional storage matrix which under the control of a master clock oscillator 24 and a timing signal generator 25 translates stored decimal coded addresses into the frequency coded form, by energizing in a predetermined sequence, amplifiers 21, three at a time. The timing generator 25 establishes the duration of transmission for each interrogation signal, for example, 5 milliseconds. There is also a 4 millisecond delay between successive operation of each combination of three amplifiers. Thus, a sequential interrogation of fifty thousand addresses occurs every eight minutes.

The three frequencies $f_1$, $f_2$ and $f_3$ which comprise the sequential output of amplifiers 21 constitute an interrogation signal which modulates a carrier frequency of, for example, eight (8) mc. in modulator 23. The output of modulator 23 is added to the program signals for channels A, B and C in signal combining network 17 for transmission to the receiving stations by a coupling means such as coaxial cable system 11. However, it is to be appreciated that the coded interrogation signal could also be transmitted by radiation from an antenna.

In response to its own received interrogation signal control apparatus 13, preferably during the 9 millisecond interval between interrogation of successive stations, in a manner hereinafter more fully described, transmits to survey and billing apparatus 19, for example, by coaxial cable system 11, a reply signal which is representative of a program charge acknowledgment and of the program corresponding to such charge. Such a signal may be, for example, a single different frequency tone for each available pay program channel, that is, 30, 40 and 50 kc. tones corresponding to channels A, B and C respectively. This frequency tone is received by one of channel receivers 27A, 27B and 27C which also correspond respectively to channels A, B and C.

Choosing channel receiver 27A to illustrate typical operation, an output signal is produced by it in response to a received 30 kc. tone. This signal is coupled to channel accumulator and readout apparatus 28A which is similar in construction and operation to apparatus 28B and 28C which in kind respond to signals from channel B receiver 27B and channel C receiver 27C, respectively. Each receiver 27A output signal received by apparatus 28A indicates that one subscriber is viewing at that time, the program offering on Channel A. The indications so accumulated by apparatus 28A are totaled and may be read out at any convenient time.

The output signal produced by one of receivers 27A, 27B or 27C in response to a reply received from an interrogated receiving station is also coupled to a reply signal register 29 which responds to the receipt of such signal by providing an output signal to a logic AND circuit 30. During the 9 millisecond interval described above, the interrogated address is stored in an address storage register 31 which also couples to circuit 30 an indication of such storage. Circuit 30 is enabled by signals being received from both address register 31 and reply register 29 and when enabled couples an activating signal to recording apparatus 32 which may be, for example, a magnetic drum or a high speed punched paper tape. Apparatus 32 records and stores the information that a certain pay program offering is viewed by a certain subscriber, the offering and the subscriber being identified by the signals simultaneously activating the AND circuit 30. Moreover, at the beginning of each new interrogation cycle, apparatus 32 whose operation is controlled by a timing signal generator 25 records information received from a date, time and price generator 33. Generator 33 generates coded signals for example, pulse trains, representative of the date, time and program charge of program offerings then available on channels A, B and C.

Thus, it is seen that the information stored in accumulators 28A, 28B and 28C can be used to determine audience interest in program offerings, whereas the information stored in apparatus 32 can be used to establish customer billing requirements.

As has been hereinbefore briefly described, each receiving station includes control apparatus 13 constructed in accordance with the present invention and preferably assembled in a conveniently sized container or adapter. Each adapter has a channel selector switch 34 which has positions corresponding to the available pay television program channels. For example, channels A, B and C. Switch 34 also has a position corresponding to a disconnection of the apparatus 13 from the receiver 12 (RCVR position). In the last-mentioned position, an antenna 14 is connected through an antenna switch 35 to the appropriate terminals of a conventional unmodified television receiver 12. In all other switch 34 positions the adapter program signal circuits are coupled to the receiver 12 through the switch 35. A power supply 36 is designed to operate from any standard source of 60 cycle power. It is to be understood in what follows that the adapter functions in a similar manner in all pay channel positions of switch 34.

In the operation of the adapter no pay program signal is applied to the antenna input terminals of receiver 12 until the proper program charge acknowledgment has been made by a customer. This acknowledgment can be made by depositing the required amount of money in a price indication and coin collection mechanism 37. When the proper amount is deposited, the mechanism 37 causes power to be supplied from device 36 to the RF amplifier and mixer stages 38 and 39, respectively, which comprise adapter program signal circuits. Alternately, a switch may be provided in place of mechanism 37 for the use of credit customers who indicate their willingness to make future payment for a program viewed by activating the switch. The switch operation then supplies power to the amplifier 38 and mixer 39.

However, considering the former case, operation of switch 34 to one of the pay channel positions, for example, position C, also causes power to be applied to a demodulator 40 which is responsive to the 8 mc. modulated carrier hereinbefore described and which may contain one or more stages of amplification. The switch 34 also selects a filter pass band in program price filter 41. This band corresponds to that in which coded program price signals for the channel selected lies. The received price signal for the channel selected activates the price indication portion of mechanism 37 to provide a visual display of the program charge. After a program has been paid for, the mechanism is disabled until the program ends, or until another channel position is selected by use of switch 34.

The output of demodulator 40 is also coupled to address filters 42A, 42B and 42C, which correspond respectively to the three frequency components of a receiving station address code, that is, frequencies $f_1$, $f_2$ and $f_3$. An AND circuit 43 is enabled when the proper combination of frequencies is passed by filters 42A to 42C. With the selection of a pay channel by use of switch 34 a billing tone oscillator 44 frequency of oscillation is selected. This frequency may be chosen, for example, from the group 30, 40 and 50 kc. which correspond respectively to channels A, B and C. When the required program payment is deposited in mechanism 37, D-C power from network 36 is switched to the oscillator 44. When the oscillator is in this condition an enabling circuit signal from the AND circuit 43 energizes the oscillator 44 which produces an output signal that is transmitted by cable 11 to survey apparatus 19 for the purpose hereinbefore described with reference to apparatus 19. By the way that oscillator 44 is activated it is seen that the transmitted reply signal is truly representative of a program charge acknowledgment and of the program viewed.

The output of demodulator 40 also includes the "Barker" sound signal transmitted from source 15. The audio information contained therein is recovered by the operation of detector and AGC network 45 which additionally supplies an AGC signal to the amplification stages which may be included in demodulator 40. The "Barker" sound is then reproduced in a well-known manner by a reproducer 46.

It is to be appreciated with respect to the foregoing description of portions of control apparatus 13 that the prime functions recited are those relating to the handling of a receiver interrogation signal and the generation of a reply signal which is transmitted to survey apparatus 19.

The remaining portion of apparatus 13 comprises those circuits which translate the pay channel program signal from the coupling means to the receiver 12. As has been described, the program signals applied to amplifier 38 lie in a band from 10 to 40 mc. and have modulation components appearing in inverted order. An RF mixer 39, which may comprise an oscillator-modulator and amplification stages, heterodynes the received signal up the frequency spectrum on to a carrier which may correspond to either of standard television channels 5 or 6. The choice of either channel 5 or 6 is dependent on which one is unused in the area in which the receiving station is located. Moreover, modulation to an RF carrier higher than that which is received effectively reinverts the order of program signal modulation components so that the signal coupled from mixer 39 to the receiver 12 is in exact conformity with FCC standards.

It is to be appreciated that the components shown in the figure are of conventional construction and well known to those skilled in the broadcast and communications arts.

As has been described, pay program signal transmission from source 10 to control apparatus 13 and all other signal transmission in both directions takes place preferably over coaxial cable system 11. However, coupling means for intercoupling the components of the audience survey system may be any well-known means such as an antenna system for radiation. Moreover, although not explicitly shown in the figure, cable system 11 includes all necessary amplification, equalization and distribution networks required for signal transmission, which networks, it is to be understood, are well known in the art. In addition, it is within the scope of the teachings of the present invention to have program source 10 at a different physical location from one or more embodiments of apparatus 18 and 19 as well as to have embodiments of apparatus 18 and 19 for credit customers and other embodiments of apparatus 18 and 19 for customers viewing programs on a "pay-as-you-see" basis.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A pay television system comprising:
   signal source means for supplying a television signal and for supplying a plurality of interrogation signals individually coded to correspond to a single one of the following receiving means;
   a plurality of receiving means each for enabling reproduction of a television program from said supplied television signal upon acknowledgment of a prescribed program charge by a viewer, said plurality of receiving means including means responsive to an individual one of said interrogation signals for sending back to said first means a reply signal representative of said program charge acknowledgment and of the program corresponding thereto;

correlating and recording means coupled to said signal source means and responsive to said receiving station reply signals for correlating each interrogation signal with its respective reply signal and for recording said correlations to obtain audience billing information;

means responsive to said receiving station reply signals for accumulating and displaying said signals to obtain audience interest information;

and coupling means for intercoupling said signal source means and said plurality of said receiving means.

2. A pay television system constructed in accordance with claim 1 in which each of said receiving means further includes a television receiver for reproducing a pay television program from said supplied television signal.

3. A pay television system constructed in accordance with claim 1 in which said coupling means comprises an interconnecting cable system and in which each of said receiving means additionally comprises apparatus for converting said supplied television signal to frequencies appropriate for reception by a conventional unmodified television receiver.

4. A pay television system constructed in accordance with claim 3 in which said first means comprises a signal generating means for generating a periodic sequence of unique combinations of a predetermined number of a plurality of discrete frequencies, each of said combinations corresponding to only one of said plurality of receiving means.

5. An audience survey system for a pay television system of the type in which a television signal is supplied to a plurality of receiving stations, each of which includes apparatus adapted to prevent reproduction of the supplied television signal prior to acknowledgment by the viewer of a prescribed program charge, said survey system comprising:

first means for supplying a plurality of interrogation signals individually coded to correspond to a single one of said receiving stations;

means in each of said receiving stations individually responsive to its respective interrogation signal, for sending back to said first means a reply signal representative of said program charge acknowledgment and of the program corresponding thereto;

correlating and recording means coupled to said first means and responsive to said receiving station reply signals for correlating each interrogation signal with its respective reply signal and for recording said correlations to obtain audience billing information;

and means responsive to said receiving station reply signals for accumulating and displaying said signals to obtain audience interest information.

6. An audience survey system constructed in accordance with claim 5 which additionally comprises means for recording and displaying the receipt of said reply signals sent from said plurality of receiving stations.

7. An audience survey system constructed in accordance with claim 6 in which said first means comprises means for generation of a plurality of discrete frequencies and means for forming a periodic sequence of unique combinations of a predetermined number of said frequencies, each of said combinations constituting an individual one of said interrogation signals.

8. An audience survey system constructed in accordance with claim 5 which additionally comprises a cable system for intercoupling said first means to said means in each of said plurality of receiving stations.

9. In an audience survey system of a pay television system, an interrogation apparatus comprising:

first means for generating a plurality of discrete frequencies;

second means for producing a periodic sequence of unique combinations of a predetermined number of said frequencies, each of said combinations constituting an interrogation signal representative of a receiving station address;

coupling means for intercoupling said interrogation signals to a plurality of receiving stations;

correlating and recording means coupled to said first means and responsive to said receiving station reply signals for correlating each interrogation signal with its respective reply signal and for recording said correlations to obtain audience billing information;

and means responsive to said receiving station reply signals for accumulating and displaying said signals to obtain audience interest information.

References Cited

UNITED STATES PATENTS 3,078,337  2/1963  Shanahan _____ 178—5.1

ROBERT L. GRIFFIN, *Primary Examiner.*

H. W. BRITTON, *Assistant Examiner.*